Aug. 11, 1964 L. W. MURPHY 3,143,762
PROCESS FOR FACILITATING THE IMMOBILIZATION
AND SLAUGHTERING OF ANIMALS
Filed Sept. 18, 1961 2 Sheets-Sheet 1
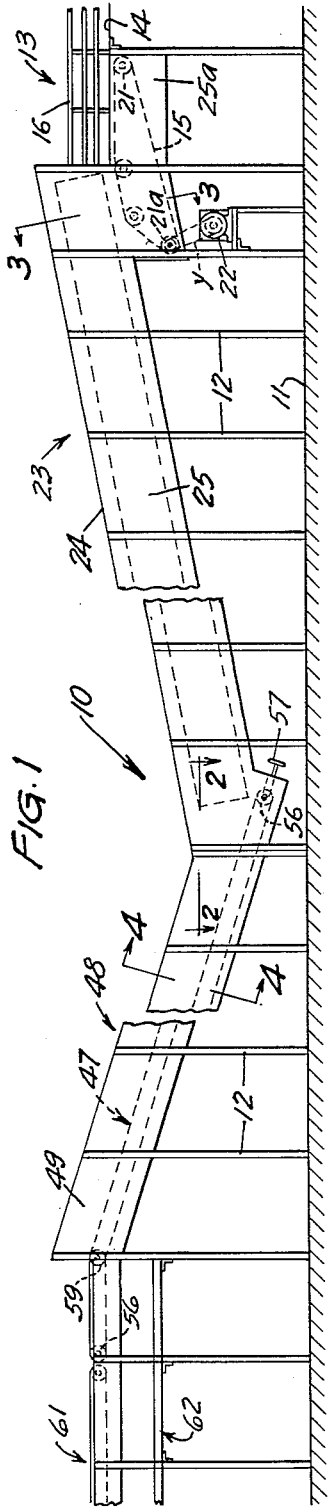
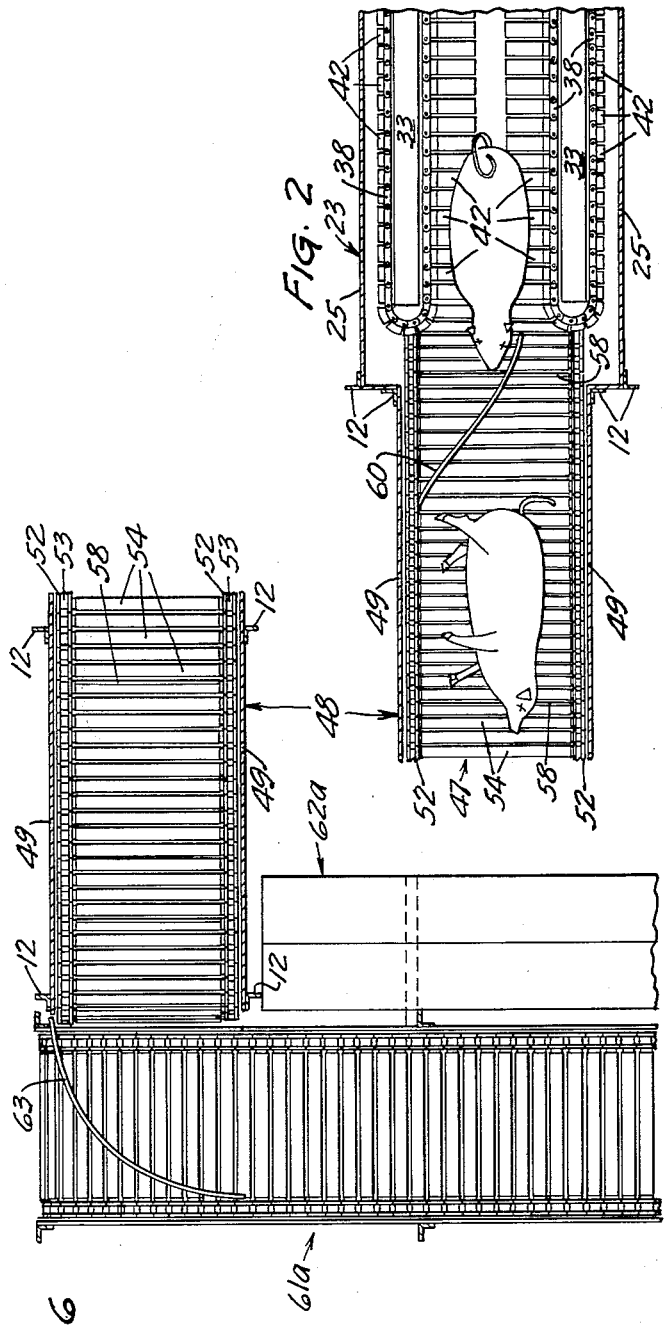
INVENTOR
LAURENCE W. MURPHY
BY
Williamson & Palmatier
ATTORNEYS Aug. 11, 1964 L. W. MURPHY 3,143,762
PROCESS FOR FACILITATING THE IMMOBILIZATION
AND SLAUGHTERING OF ANIMALS
Filed Sept. 18, 1961 2 Sheets-Sheet 2
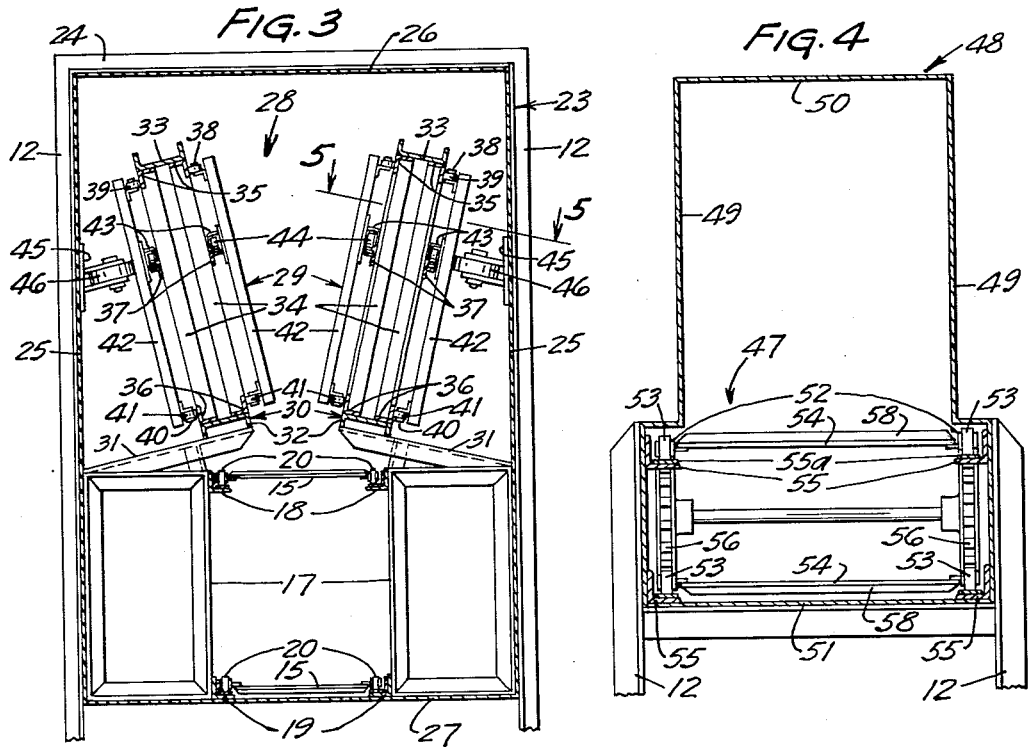
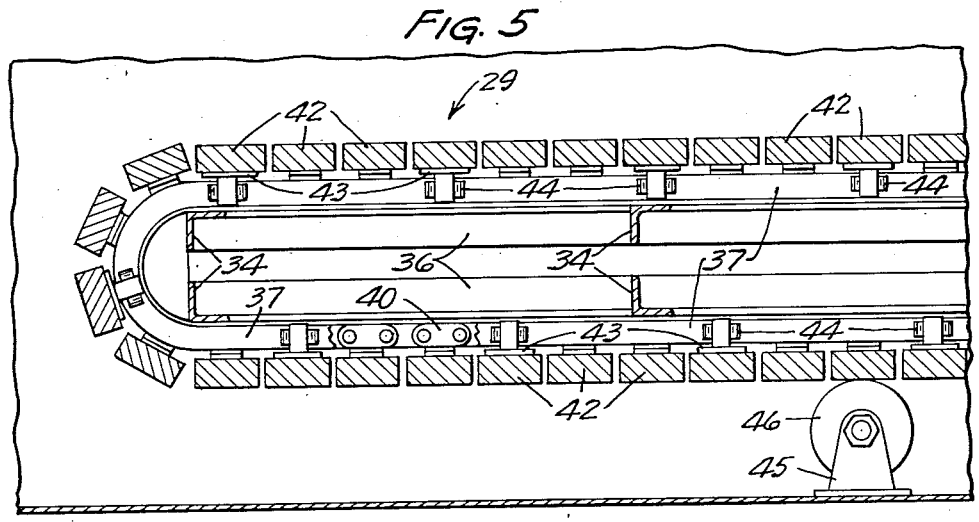
INVENTOR
LAURENCE W. MURPHY
BY
Williamson & Palmatier
ATTORNEYS

United States Patent Office 3,143,762
Patented Aug. 11, 1964

3,143,762
PROCESS FOR FACILITATING THE IMMOBILIZA-
TION AND SLAUGHTERING OF ANIMALS
Laurence W. Murphy, Austin, Minn., assignor to Geo. A.
Hormel & Company, Austin, Minn., a corporation of
Delaware
Filed Sept. 18, 1961, Ser. No. 138,630
17 Claims. (Cl. 17—45)

This invention relates to a process for facilitating the immobilization and slaughtering of slaughter animals such as hogs, sheep, calves, goats and poultry and the like.

In the prior art known to me, no provision is made for partially confining and somewhat restraining the slaughter animals during the immobilization operation, immobilization of the animals being accomplished by means of anesthetization with a gas. The slaughter animals are generally moved in single file order or in batches or individually through an immobilization section during the immobilization operation. However, these prior art processes and apparatuses have no restraining conveyor or circular means to completely support the animals in a normal upright relation during this immobilization process. Therefore, the immobilized animals fall in random positions or are otherwise discharged in random positions so that the subsequent slaughtering steps of sticking, bleeding and/or shackling are made difficult, and thereby result in the need of an attendant for turning or otherwise handling the animals to reposition the animals.

Furthermore, if the slaughter animals are moved through an anesthetizing chamber in a single file order, it is necessary in most of these prior art devices to exercise caution to prevent the animals from stampeding and to be properly oriented for this single file movement. In order to cope with problems of this type special entry gates and barrier mechanisms have been designed and in some instances an attendant is needed to assure proper feeding of the animals for movement through the anesthetizing section of chamber 4.

It is therefore an object of this invention to provide a novel and highly efficient process for anesthetizing and slaughtering slaughter animals, the slaughter animals being supported in normal upright relation and being confined against lateral and vertical longitudinal movement while moving the animals in single file order through a gas chamber, to thereby immobilize the voluntary process of the animal and thereafter successively releasing and simultaneously turning the immobilized animal to dispose each animal upon its side at a predetermined position.

Another object of this invention is the provision of a novel and improved process of the class described wherein the slaughter animal may be initially moved in random fashion through the entry runway without any danger of stampeding by the animals, so that the slaughter animals are received in single file order for supporting in normal upright relation and for confinement against lateral and vertical longitudinal movement while moving the animals through a gas chamber, the rate of movement of the animals through the chamber being synchronized with respect to the linear distance of the travel so that the voluntary processes of the animals are immobilized without effecting the involuntary processes of the animals.

A further object of this invention is the provision of a novel process of great commercial capacity for use in the anesthetization and slaughtering of slaughter animals, the animals being moved in normal upright confined position through a gas chamber to immobilize the voluntary processes of the animals, successively releasing and simultaneously turning the immobilized animals from the confined position to dispose each animal upon its side in a predetermined position extending longitudinally of the direction of travel.

These and other objects and advantages of this invention will more readily appear from the following description made in connection with the accompanying drawings wherein like reference characters refer to the same or similar parts throughout the several views, and in which:

FIG. 1 is a side elevational view of one embodiment of my invention with portions thereof broken away and foreshortened for clarity;

FIG. 2 is a cross sectional view on an enlarged scale taken approximately along line 2—2 of FIG. 1 and looking in the direction of the arrows;

FIG. 3 is a vertical cross sectional view on an enlarged scale taken approximately along line 3—3 of FIG. 1 and looking in the direcon of the arrows;

FIG. 4 is a vertical cross sectional view on an enlarged scale taken approximately along line 4—4 of FIG. 1 and looking in the direction of the arrows;

FIG. 5 is a horizontal cross sectional view on an enlarged scale taken approximately along line 5—5 of FIG. 3 and looking in the direction of the arrows; and FIG. 6 is a top plan view of the discharge end of the deck conveyor advantageously employed in the anesthetizing operation and being illustrated with a modified form of a sticking and bleeding conveyor.

Referring now to the drawings and more particularly to FIG. 1, a general overall side elevational view of my apparatus is there shown. It is pointed out that in my novel process and apparatus, it is preferred that the slaughter animals such as pigs and the like be moved in single file order through an anesthetizing chamber so that the voluntary processes of the animals will be immobilized without affecting the involuntary processes, and thereafter continuing to support the immobilized animals during the subsequent slaughtering steps of "sticking" and bleeding. During the sticking and bleeding operation, the animals may be supported for substantial horizontal movement or the animals may be moved while being disposed in a suspended position as by a shackling conveyor mechanism.

One embodiment of my novel apparatus for carrying out the steps of my novel process includes an elongate passageway designated in its entirety by the reference numeral 10. It is pointed out that this passageway will be suitably housed within a building including a floor 11. The various portions of the apparatus comprising the elongate passageway 10 will be supported upon the floor 11 by means of upstanding supporting structural frame members 12 as best seen in FIG. 1.

An elongate passageway 10 includes an entry runway section 13 through which the animals pass in single file order. This runway section 13 includes a stationary runway portion 14 through which the animals will pass from the confining pens and also includes a movable runway portion in the form of a short deck conveyor 15. The entire elongate passageway 10 is of relatively narrow width and the entry runway section 13 is provided with suitable upstanding side rails as best seen in FIG. 1.

Referring now to FIG. 3, it will be seen that the deck conveyor 15 which comprises a movable runway portion is provided with laterally spaced apart support frames 17 constructed of suitable metallic material. These laterally spaced apart support frames 17 are provided with upper tracks 18 and lower tracks 19, these tracks being in the form of angle irons and serving to provide the supporting and guiding contact surfaces for the support rollers 20 of the deck conveyor 15. The deck conveyor is also provided with a plurality of pulley rollers 21 over which the belt is trained and one of these pulley rollers 21a is drivingly connected to a source of power 22 in the form of a motor by means of a conventional belt Y. The deck conveyor 15 is driven in a direction so that the upper flight of run thereof is moving to the left as viewed in FIG. 1 or in the forward direction of the elongate passageway 10.

The elongate passageway 10 also includes an elongate anesthetizing section 23 comprised of a declined gas chamber or housing 24 in which is contained a suitable anesthetizing gas such as carbon dioxide. This gas chamber or housing 24 includes substantially upstanding side walls 25, a top wall 26 and a bottom wall 27. It will also be seen that side walls 25 have rearwardly projecting extensions 25a to which are rigidly secured the laterally spaced apart support frames 17, of the movable runway portion 15.

Means are provided for supporting, confining and moving the slaughter animals to the anesthetizing section for immobilization of the voluntary processes of the slaughter animals and this means includes an elongate substantially V-shaped conveyor mechanism 28. It will be noted that this conveyor mechanism 28 extends through the anesthetizing section and has its receiving end communicating with the entry runway section 13. Actually the forwardmost decline portion of the short deck conveyor 15 underlies the receiving end of the V-shaped conveyor mechanism 28 which extends into the anesthetizing housing 24 as best seen in FIG. 1.

Referring now to FIGS. 3 and 5, it will be seen that the V-shaped conveyor mechanism 28 is comprised of a pair of substantially identical elongate conveyors 29 which are disposed in inclined downwardly converging relation with respect to each other to define the substantially V-shaped recess therebetween. Each of these conveyors 29 are substantially of identical construction and each includes a support frame 30. Each of the support frames for the conveyors 29 is comprised of base members 31 which extend inwardly in angulated relation with respect to the side walls 25 of the anesthetizing housing 24. These base members 31 have rigidly attached thereto a lower channel member 32 of the conveyor support frames as best seen in FIG. 3. Each of the lower channel members 32 is rigidly interconnected to the upper channel members 33 by means of vertical frame members 34 or spacers in the form of angle members. Referring again to FIG. 3, it will be seen that upper channel members 33 of each of the frame members has rigidly attached thereto an upper track 35 of angular cross sectional configuration. The lower channel member 32 of each of the support frames 30 is provided with a lower track 36 also of angular cross sectional configuration and an intermediate track 37 is rigidly attached to the upstanding spacers or frame members 34 of each of the support frames 30. It will be noted from FIG. 5 that the intermediate track is illustrated as being a continuously closed elongate arcuate shaped track structure with a horizontal leg of the angle defining the supporting surface thereof. It is also pointed out that while not shown in the drawing the upper and lower tracks 35 and 36 respectively are also continuous and have arcuate ends in the manner of the intermediate track 37.

Each of the conveyors 29 include an endless upper chain 38 having a plurality of rollers 39 engaging the upper track 35 and also includes an endless lower chain 40 also having a plurality of rollers 41 engaging the lower track 36, for rolling contact therewith. The links comprising the upper and lower chains are suitably connected to substantially vertically disposed elongate conveyor slats 42 so that each of the conveyors 29 is of endless flexible belt type conveyor. Referring again to FIG. 5 it will be seen that selected of the conveyor slats 42 are provided with roller brackets 43 for rotatably carrying rollers 44, the latter being disposed in rolling contact with the intermediate track 37 for supporting the belt portion of each of the conveyors upon its associated support frame 30. Means are also provided for each of the conveyors 29 for preventing the rollers 44 on the outer run or flight of each of the conveyors 29 from becoming disengaged from rolling contact with the intermediate track 37. To this end the side walls 25 of the anesthetizing housing 24 have suitably secured thereto brackets 45 which project inwardly and which rotatably support rollers 46 having roller bearing contact with the outer surface of the slats 42 as best seen in FIG. 3. It will also be noted that the outer flight or run of the endless conveyors 29 because of the inclined disposition of the conveyors has the tendency through action of gravity to move somewhat downwardly so that in the event the endless conveyor becomes loosened, it could result in the rollers 44 becoming disengaged from the intermediate track 37. However, not shown in the drawings, suitable drive means will be provided for driving each of the conveyors 29, the conveyors being driven in synchronized relation.

Thus, it will be seen that slaughter animals entering runway section 13 will be moved in single file order forwardly by means of the movable deck conveyor 15 and the animals will be supported in normal upright relation between the conveyors 29 so that the animals will be confined against lateral and longitudinal movement. The conveyor mechanism 28 will be driven so that the animals will be moved through the anesthetizing section 23 and it is pointed out that the operating speed of the conveyor mechanism 28 is synchronized with respect to the distance of travel of the animals through the anesthetizing section housing 24 so that the period of time for moving and restraining the animals through this anesthetizing chamber will be sufficient to immobilize the voluntary processes of the animal without affecting the involuntary processes of the animals such as breathing, circulation, etc. It will, therefore, be seen that when the animals reach the discharge end of the conveyor mechanism 28, the animals will have their voluntary processes immobilized.

Means are provided for removing the immobilized slaughter animals from the anesthetizing section and this removal means is in the form of an ascending endless deck conveyor designated generally by reference numeral 47. Referring now to FIGS. 1, 2 and 4 it will be seen that this ascending endless deck conveyor is disposed within and extends through an elongate housing 48 which communicates with and forms a continuation of the anesthetizing housing 24. It is pointed out that the conveyor housing 48 and the anesthetizing chamber or housing 23 diverge upwardly with respect to each other to thereby define a depressed lower portion of the passageway 10. With this arrangement, the anesthetizing gas such as carbon dioxide accumulates in this lower portion since this anesthetizing gas has the physical property of being somewhat heavier than air thus permitting the opposite ends of housing 24 and housing 48 to be open without the danger of the gas escaping. Housing 48 includes upstanding side walls 49, a top wall 50 and a bottom wall 51. It will be noted that the lower portions of the side walls 49 are offset outwardly so that the lowermost portion of the housing 48 is somewhat larger in cross sectional configuration than the upper portion thereof to thereby accommodate the removal deck conveyor 47.

This removal deck conveyor is comprised of a pair of endless chains 52, each having a plurality of rollers, the chain links being transversely interconnected by a plurality of slats 54. It will be seen that a pair of laterally spaced apart tracks 55 are respectively attached to the inner surfaces of the side walls 49. Each of these tracks are of angulated cross sectional configuration and each is provided with a wear plate 55a, the tracks serving to provide the continuous engaging surface for the rollers 53. The endless deck conveyor is trained over conventional pulley rollers 56 as best seen in FIG. 1 and one end of this deck conveyor is provided with a conventional belt tightener 57. The deck conveyor is also provided with a plurality of upstanding retaining elements 58 to permit the immobilized slaughter animals from sliding downwardly and rearwardly along the ascending conveyor. This deck conveyor 47 may be provided with suitable drive connection in the form of a driven sprocket structure 59 as best seen in FIG. 4, the latter being drivingly interconnected to a suitable drive means such as an electric motor or the like.

After the animals have been immobilized and laid in predisposed positions, the next step involved in the slaughtering operation is that of sticking and bleeding the animals. In carrying out the sticking and bleeding steps of the slaughtering process, the animals may be delivered to a sticking and bleeding conveyor or may be suspended by shackles for the sticking and bleeding steps. It is desirable, however, to have the immobilized animals disposed upon the removal conveyor in a predetermined position regardless of whether the slaughter animals are to be delivered to a foraminous substantially horizontally disposed bleeding conveyor or are to be suspended from their hind legs by a shackling conveyor. By having all of the animals disposed in a predetermined position, it will be seen that the shackling or sticking and bleeding steps may be easily carried out. To this end we have provided means for successively and automatically turning the immobilized animals from their confined upright position to dispose each of the animals upon its side or a predetermined position upon the removal conveyor means 47. Referring again to FIGS. 1 and 2, it will be seen that the turning rod or equivalent means 60 is disposed adjacent the delivery end of the conveyor mechanism 28 and in overlying angulated relation with respect to the lower end of the deck conveyor 47. Thus, it will be seen that as the immobilized animals are moved forwardly and discharged by the conveyor mechanism, the left side of the animal as viewed in FIG. 2 will be successively engaged to turn the animal as in a camming action upon its side so that each animal will be disposed longitudinally upon the removal deck conveyor 47 and with the throat of the animal facing a given direction.

Referring again to FIG. 1, it will be seen that the immobilized animals will be removed from the anesthetizing chamber by the removal deck conveyor 47 and will be delivered to a sticking and bleeding conveyor 61. The sticking and bleeding conveyor will move the immobilized animal past a sticking station 62 wherein an attendant will stick and sever the carotid artery and jugular vein of the animal to permit bleeding of the animal as the animal is continued to be supported by the bleeding conveyor. In this connection it is pointed out that this sticking and bleeding conveyor 61 will be the foraminous type and in the embodiment illustrated in FIG. 1, the sticking and bleeding conveyor actually constitutes a continuation of the removal deck conveyor 47, but of course may be a separate additional conveyor.

It is pointed out that the conveyor 61 may be a conveying means to convey the animals to a shackling station rather than constituting a sticking and bleeding conveyor. If conveyor 61 conveys animals to a shackling station, it will be readily appreciated that the predetermined positioning of the animals to extend longitudinally of the direction of travel will facilitate the attendant grasping the rear legs of the animals for attachment of the shackles thereto.

Referring now to FIG. 6, it will be seen that I have illustrated therein the modification of the embodiment illustrated in FIG. 1. In FIG. 1 it will be noted that the conveying mechanism 61 is disposed in longitudinal co-extensive relation with respect to the removal conveying mechanism 47. However, in FIG. 6 the removal conveying mechanism 47 is shown in cooperating relation with a transversely disposed conveying mechanism 61a, the latter being of the deck conveyor type similar to the conveyor mechanism 61 of FIG. 1. This arrangement will be used in the event it becomes necessary to conserve space and the conveyor mechanism 61 will move the immobilized animals past a sticking station 62a wherein an attendant will stick and sever the carotid artery and jugular vein of the immobilized animal. It will be noted however that means are provided for turning the animals delivered from the removal conveyor 47 to position the animals longitudinally upon the deck conveyor mechanism 61a. This means includes a turning plate 63 which is smoothly arcuately curved to deflect the animal from its direction of movement upon the removal conveyor mechanism approximately 90 degrees for transverse movement upon the conveyor mechanism 61a. It is also pointed out however that in the event the conveyor mechanism 61a is a sticking and bleeding conveyor, the conveyor will be of the foraminous type and the immobilized animal will continue to be supported in substantially horizontal relation upon the conveyor throughout the sticking and bleeding operation. However, it is also pointed out that the conveyor 61a may also be a conveying means for conveying the immobilized animal to a shackling station to permit ready shackling of the animals for sticking and bleeding while in the suspended position.

When the apparatus is used to carry out the steps of my novel immobilization and slaughter process, the animals will be moved along runway 14 from a confining area or pen. An attendant may be employed to urge the animals along through the use of an electrical prodding device commonly used for this purpose. Since the stationary runway portion 14 is disposed in registering relation with the deck conveyor 15, the slaughter animals will readily move from the stationary runway portion to the deck conveyor 15. The animals will be moved toward the entrance of the anesthetizing chamber 24 while standing in normal upright position, this movement being accomplished partly by movement of the deck conveyor 15 and partially by forward locomotion of the animals themselves. Because of the unique V-shaped cross sectional configuration of our conveying mechanism 28, the slaughter animals will necessarily be received and supported by the conveying mechanism in single file order only. It will be noted that the upper run of the deck conveyor 15 extends and underlies the rearmost portion of the conveyor mechanism 28 to thereby facilitate reception of the slaughter animals into this conveyor mechanism. It will be noted, as best been in FIG. 2, that the conveyors 29 will apply endward pressure against the sides of the animals throughout their longitudinal extents so that the conveyor mechanism 28 not only supports and moves the animals through the anesthetizing chamber, but restrains the animals against both lateral and longitudinal and vertical movement during the anesthetizing step.

As pointed out above, the operational speed of the conveyor mechanism 25 will be synchronized with respect to the linear distance of travel of the animals through the anesthetizing chamber 24 so that the period of time for moving the animals through this anethetizing chamber will be sufficient to immobilize the voluntary processes of the animals without affecting the involuntary process of the animals. Thus the animal will be immobilized when the animal is released by the conveyor mechanism 28 and delivered upon the removal conveyor 47. Simultaneously with the release of the animals upon the removal conveyor 47, the turning rod 60 will be engaged by the animal to turn the animal to lie upon its side in a predetermined position upon the removal deck conveyor 47. It will be seen that the immobilized animals will be successively and automatically turned to lie in a pre-determined position extending longitudinally of the direction of travel of this removal deck conveyor 45.

The immobilized animals are conveyed by this removal deck conveyor 47 and delivered to a sticking and bleeding conveyor 61 past the sticking station 62. The carotid artery and jugular veins of each of the animals are severed and the foraminous construction of the sticking and bleeding conveyor permits ready collection of the blood during this bleeding operation. In the event the modification illustrated in FIG. 6, is utilized, the animals will be simultaneously turned when delivered to the sticking and bleeding conveyor 61a. It is again pointed out, however, that this conveyer 61 or 61a, rather than comprising a sticking and bleeding conveyor, may actually constitute a transfer means for conveying the animals to the shackling station where the animals will be suspended prior to the sticking and bleeding step.

It is pointed out that if the conveyor mechanism 61 and 61a, comprising sticking and bleeding conveyors, the time interval of travel of the animal after sticking is such that complete bleeding as required by Federal law will be effected before each animal is delivered for a subsequent butchering operation.

From the foregoing description, it will be seen that I have provided a novel process for use in facilitating immobilization and slaughering of slaughter animals, the process being especially adaptable for anesthetization and slaughter of the larger slaughter animals, such as hogs and the like, and being capable of high capacity continuous or intermittent production. It will also be seen from the preceeding paragraph that my novel process permit rapid feed of the slaughter animals into the anesthetizing section wherein the animals are moved therethrough, without the danger of stampeding and the like in a rapid type operation.

It will further be seen that I have provided a novel process wherein the slaughter animals are not only supported in normal upright position, but are confined against lateral, vertical and longitudinal movement while moving through the anesthetizing chamber, and thereafter automtically and successively turning the animals when the animals are removed from the anesthetizing chamber, and continuing to support the immobilized animal in predetermined position for facilitating carrying out the subsequent steps in the slaughtering operation.

It will also be seen that I have provided a novel apparatus for use in facilitating anesthetization and slaughtering of slaughter animals which is not only of simple and inexpensive construction but which functions in a more efficient manner than any heretofore known comparable devices. It will further be noted that the steps of my novel apparatus serve to permit immobilization and slaughter of slaughter animals in a manner to effect a great saving in time and labor.

It is pointed out that when the term "successively" is used in the claims, the term is intended to include not only the successive handling of individual animals but successive handling of two or more animals at a time. It is also pointed out that while the process and apparatus comprising the instant invention permits the successive handling, confining, conveying, etc., of the animals in a cyclic operation which may be characterized by intermittent or short interruptions.

It will, of course, be understood that various changes may be made in the form, details, arrangement and proportions of the various parts without departing from the general scope of my invention.

What is claimed is:

1. The process of slaughtering animals which consists in engaging and applying inward pressure against opposite sides of the animals throughout substantially the length of the animals to confine the animals against voluntary lateral, vertical and longitudinal movement and to support the animals in predetermined position such as upright while moving the animals in single file order through a gas chamber, subjecting them to an immobilizing gas in said chamber while maintaining the animals in said predetermined position for a period of time sufficient to immobilize the vountary processes of the animals without affecting the involuntary processes of the animals, releasing the immobilized animals from said confined predetermined position and mechanically turning the released animals to dispose each animal upon his side in a predetermined position.

2. The process of slaughtering animals which consists in engaging and applying inward pressure against opposite sides of the animal throughout substantially the length of the animals to confine the animals against voluntary lateral and longtitudinal movement and to support the animals in normal upright position while moving the animals in single file order through a gas chamber, subjecting them to an immobilizing gas while maintaining said animals in said chamber in said normal upright position for a period of time sufficient to immobilize the voluntary processes of the animals without affecting the involuntary processes of the animals, discharging the immobilized animals from said confined upright position and mechanically turning each animal as it is discharged upon its side in a predetermined position.

3. The process of slaughtering animals which consists in engaging and applying inward pressure against opposite sides of the animals throughout substantially the length of the animals to confine the animals against voluntary lateral and longitudinal movement and to support them in an upright position while moving the animals in single file order through a gas chamber, subjecting them to an immobilizing gas in said chamber while maintaining the animals in said position for a period of time sufficient to immobilize the voluntary processes of the animals without affecting the involuntary process of the animals, releasing the immobilized animals from said confined upright position and mechanically turning the animals to dispose each animal upon its side in a predetermined position extending longitudinally of the direction of travel, and successively delivering said immobilized animals disposed in substantially spaced apart longitudinally extending relation relative to the line of travel to support and move said animals in said line of travel past the sticking station, and sticking the throat and carotid artery and jugular veins of each animal successively at said station while it is traveling in said line and continuing to move the animals in said position for a period of travel sufficient to permit thorough bleeding thereof.

4. The process of slaughtering animals which consist in engaging and applying inward pressure against opposite sides of the animals throughout substantially the entire length of the animals to confine the animals against voluntary lateral and longitudinal movement and to support the animals in an upright position while moving the animals in single file order through a gas chamber, subjecting them to an immobilizing gas in said chamber while maintaining the animals in normal upright position for a period of time sufficient to immobilize the voluntary processes of the animals without affecting the involuntary processes of the animals, releasing and mechanically turning the immobilized animals from said confined upright position to dispose each animal upon its side in a predetermined position extending longitudinally of the direction of travel and continuing to support the immobilized animals in said direction of travel, successively delivering said animals for movement in a direction transverse of the said line of travel and continuing to support the animals longitudinally of said transverse direction of travel, continuing to support and move said animals in said transverse line of travel past a sticking station, sticking the throat and carotid artery and jugular vein of the animal while traveling in said transverse line and continuing to move the animal in said posiiton for a period of time sufficient to permit thorough bleeding thereof.

5. The process of slaughtering animals which consists in engaging and applying pressure against opposite sides of the animal throughout substantial lengths of the animals to confine the animals against voluntary lateral, vertical and longitudinal movement and to support the animals in predetermined position such as upright while moving the animals in single file order through a gas chamber, subjecting them to an immobilizing gas in said chamber while maintaining the animals in said predetermined position for a particular time sufficient to immobilize the voluntary processes of the animal without affecting the involuntary processes of the animal, releasing the animals and progressively turning said animals as they are released from said confined predetermined position to dispose each animal in a predetermined position relative to the direction of travel.

6. The process as defined in claim 5 wherein the animals are turned while in the immobilized state from said confined prior position to dispose each animal upon its side in a predetermined position extending longitudinal of the direction of travel and successively delivering said immobilized animal disposed in substantially spaced apart longitudinal extending relation relative to the line of travel to support and move said animals in said line of travel to a shackling station and successively shackling each animal while it is traveling in said line to suspend the animals and continuing to move the animals in said shackled condition.

7. The process of slaughtering animals which consists in engaging and applying inward pressure against opposite sides of the animals throughout substantially the length of the animals to confine the animals against voluntary lateral, vertical and longitudinal movement and to support the animals in predetermined position such as upright while moving the animals through a gas chamber, subjecting them to an immobilizing gas in said chamber while maintaining the animals in said predetermined position for a period of time sufficient to immobilize the voluntary processes of the animals without affecting the involuntary processes of the animals, and releasing and mechanically turning the immobilized animals from said confined predetermined position and thereby disposing each released immobilized animal in a predetermined position.

8. The process of claim 7, wherein the animal is turned as it is released from said confined predetermined position.

9. The process of claim 7, wherein the immobilized animal is turned upon its side in a predetermined position.

10. The process of slaughtering animals which comprises conveying an animal along a predetermined path of travel, immobilizing the voluntary processes of the animal without affecting the involuntary processes of the animal during the course of said travel, and mechanically turning the immobilized animal to a predetermined position.

11. The process of claim 10, wherein the animal is maintained in a predetermined position during the conveying and immobilization thereof.

12. The process of claim 10, wherein the animal is held against voluntary lateral, vertical and longitudinal movement in a predetermined position during the conveying and immobilization thereof, and wherein the immobilized animal is released and mechanically turned from said predetermined position to dispose the released immobilized animal in a predetermined position.

13. The process of claim 10, wherein the animal is immobilized by subjecting same to an immobilizing gas.

14. The process of claim 10, wherein the animal is released from the conveying means and the released animal is mechanically turned to said predetermined position.

15. The process of slaughtering animals which consists in engaging and applying inward pressure against opposite sides of the animals throughout substantially the length of the animals to confine the animals against voluntary lateral, vertical and longitudinal movement and to support the animals in predetermined position such as upright while moving the animals along a predetermined path of travel, immobilizing the voluntary processes of the animal without affecting the involuntary processes of the animal while maintaining the animal in said predetermined position, and releasing and mechanically turning the immobilized animals from said confined predetermined position to dispose the animal in a predetermined position.

16. The process of slaughtering animals which comprises confining an animal on a conveyor in a predetermined position and conveying the animal along a predetermined path of travel, immobilizing the voluntary processes of the animal without affecting the involuntary processes of the animal while maintaining the animal in said predetermined position on said conveyor, discharging the immobilized animal from said conveyor and mechanically turning the immobilized animal from said confined predetermined position to another predetermined position.

17. The process of slaughtering animals which consists in engaging and applying inward pressure against opposite sides of the animals throughout substantially the length of the animals to confine the animals against voluntary lateral, vertical and longitudinal movement and to support the animals in a normal upright position while moving the animals head first through a gas chamber, subjecting them to immobilizing gas in said chamber while maintaining the animals in said predetermined position for a period of time sufficient to immobilize the voluntary processes of the animals without affecting the involuntary processes of the animals, engaging the anterior portion of each animal with a mechanical turning medium as that portion of the animal is released and before release of the posterior portion of the animal thereby progressively mechanicaly turning each immobilized animal from its confined predetermined upright position as it is released to a predetermined position upon its side.

References Cited in the file of this patent

UNITED STATES PATENTS

| | | |
|---|---|---|
| 712,579 | Nicholson et al. | Nov. 4, 1902 |
| 2,912,715 | Moss | Nov. 17, 1959 |
| 2,978,737 | Hughes | Apr. 11, 1961 |
| 3,027,594 | Moss | Apr. 3, 1962 |
| 3,031,716 | Hughes | May 1, 1962 |
| 3,081,483 | Hughes | Mar. 19, 1963 |

FOREIGN PATENTS

| | | |
|---|---|---|
| 1,125,412 | France | July 16, 1956 |